United States Patent [19]

Clayland, Jr. et al.

[11] Patent Number: 4,641,528
[45] Date of Patent: Feb. 10, 1987

[54] SPECIMEN ANALYSIS INSTRUMENT ASSEMBLY

[75] Inventors: John W. Clayland, Jr., Placerville; Carl P. Daniel, El Dorado Hills, both of Calif.

[73] Assignee: American Hospital Supply Corp., Deerfield, Ill.

[21] Appl. No.: 776,200

[22] Filed: Sep. 16, 1985

[51] Int. Cl.$^4$ .......................... C12M 1/34; G01S 5/18
[52] U.S. Cl. ..................................... 73/597; 367/117; 367/127; 367/907; 435/287; 435/291
[58] Field of Search ................. 73/597; 367/117, 127, 367/129, 907; 422/73, 102, 104; 435/287, 291, 301; 364/413, 414

[56] References Cited

U.S. PATENT DOCUMENTS

| Re. 30,397 | 9/1980 | King | 128/660 |
|---|---|---|---|
| 3,821,469 | 6/1974 | Whetstone et al. | 367/127 |
| 3,924,450 | 12/1975 | Uchiyama et al. | 73/597 |
| 4,012,588 | 3/1977 | Davis et al. | 367/127 |
| 4,252,897 | 2/1981 | Axford et al. | 435/291 |

FOREIGN PATENT DOCUMENTS 118276  9/1984  European Pat. Off. ............ 435/291

Primary Examiner—Stewart J. Levy
Assistant Examiner—John E. Chapman, Jr.
Attorney, Agent, or Firm—Roger A. Williams; Richard Myers; Robert Hartenberger

[57] ABSTRACT

An assembly for identifying the results of a specimen analysis wherein such specimen analysis occurs in an array of discrete cells. The assembly includes a housing having top, bottom, end walls, and sidewalls. An array receiving recess is provided on the top wall for receiving and holding in a fixed position the array of the discrete cells. An ultrasonic signal producing stylus is provided for selectively producing an ultrasonic signal adjacent a cell in the array in which the results of the analysis are to be identified. A first ultrasonic signal transducer is provided on the top wall for converting the ultrasonic signal from the ultrasonic signal generator to a first electrical signal. A second ultrasonic signal transducer is provided on the top wall for converting the ultrasonic signal from the ultrasonic signal generator to a second electrical signal. A microprocessor is provided electrically operatively connected to the first ultrasonic signal transducer, the second ultrasonic signal transducer, and the ultrasonic signal producing stylet. The microprocessor compares the first and second electrical signals received and identifies such signals to the cell above which the ultrasonic signal was produced.

8 Claims, 4 Drawing Figures

SPECIMEN ANALYSIS INSTRUMENT ASSEMBLY

BACKGROUND OF THE INVENTION

In the clinical laboratory environment, there is an ongoing intensive effort to develop instruments for performing or analyzing the clinical assays performed. Instrumentation and automation in the chemistry and hemotology clinical laboratory has outpaced the instrumentation and automation in the microbiology lab.

Two areas of microbiological testing in the clinical laboratory are identifying microbes such as bacteria and determining minimum inhibitory concentrations or MIC values of antimicrobial agents. The instruments that are used for determining MIC values generally use a light source and some means for measuring light passing through a cell wherein a particular specimen has been allowed to react and incubate with a known antimicrobial agent. Depending upon whether the light is scattered, absorbed, reflected, or passed through the cell, the MIC values can be determined. Similarly, instruments for identifying microbes can use the same technique of measuring whether light is passed through a cell containing a particular specimen and the necessary identifying reagents.

One system for identifying bacteria and determining MIC values is disclosed in U.S. Pat. No. 4,448,534, issued May 15, 1984, to Wertz, Hathaway, and Cook, the entire disclosure of which is incorporated herein by this reference. In that patent, an automatic scanning apparatus for performing optical density tests on liquid samples, as well as methods for testing for antibiotic susceptibility and identifying microorganisms, is disclosed. The apparatus includes a system for automatically, electronically scanning each well of a multi-well tray containing many liquid samples. A light source is passed through the cells to an array of photosensitive cells corresponding to each well in the tray. Within the tray, there is a calibrating or comparison cell. Electronic apparatus reads each cell in sequence, quickly completing the scan without physical movement of any parts. The resultant signals are compared with the signals from a comparison cell and with other signals of stored data and determinations are made and can be displayed or printed out.

A system of the type described in the patent is sold by the American MicroScan division of American Hospital Supply Corporation, and commonly referred to as the autoSCAN-3 (trademark of American Hospital Supply Corporation) susceptibility instrument and its successor instrument, an autoSCAN-4 susceptibility instrument. A predecessor instrument provided a light source which illuminated each cell of the tray and an attendant visually inspected each cell and noted on a provided recording chart whether there was growth (turbidity) or no-growth (clear) in each cell.

Another predecessor instrument which is commercially available is an MIC determining instrument, also sold by the American MicroScan division of American Hospital Supply Corporation and identified as the touchSCAN (trademark of American Hospital Supply Corporation) susceptibility instrument. The instruments utilize a tray or panel containing an array of wells in each of which a determination is being conducted. In the touchSCAN instrument, the panel is placed within a panel receiving slot which is covered by a plurality of touch sensitive switches corresponding to each of the cells or wells in the panel. A light source in the instrument is activated and based upon the user's viewing of each of the cells in the panel, the appropriate touch-sensitive switch is activated by the user. The touch-sensitive switch sends an electrical signal to a microprocessor which can record and store the data and identifying values for each cell for which the signal has been generated.

It would be desirable to provide an instrument which could receive trays and panels and which can be readily read by simple actuation which readily and specifically identifies a given cell in the array of cells on the panel. In addition, it would be desirable to provide an instrument which could make such identifications without regard to the width and length of a panel and without regard to the number of cells on the array on the panel. It would also be desirable to provide an instrument in which the operator would have a clear view of each well and wherein the operator would not have to look through a hole in the switch matrix. It would also be desirable to provide an instrument which would not require special overlays and wherein identifying indicia can be placed directly on the panel and read directly by the operator during analysis. It would also be desirable to provide an instrument which could read a variety of trays without the need to provide different well locations and which instrument could be programmed for the geometry of differing panels to identify and locate particular cells within the array of a particular panel.

SUMMARY OF THE INVENTION

The invention herein is directed to an instrument for use in the clinical laboratory. The invention herein is an assembly for identifying the results of a specimen analysis wherein such specimen analysis is conducted in and over an array of discrete cells provided in a panel or tray. The assembly includes a housing having top, bottom, and sidewalls. A panel receiving slot or recess is provided on the top wall of the housing. The recess receives and holds the panel containing the array of discrete cells in a fixed position.

In the housing is a light source for providing light which can be directed through the cells in the array. An ultrasonic signal generator is provided in the assembly which can be used to selectively produce an ultrasonic signal upon actuation by the user. The ultrasonic signal generated is generally at about 40 kilohertz (KHz). The ultrasonic signal is generated by actuation of the user immediately adjacent and above a cell in the array in which the results of the analysis are to be identified.

A first ultrasonic transducer is provided on the top wall of the housing. The first ultrasonic transducer converts the ultrasonic signal created by the ultrasonic signal generator above a particular well to a first electrical signal. A second ultrasonic transducer is also provided on the top wall. The second ultrasonic transducer converts the same ultrasonic signal generated by the ultrasonic signal generator above a particular cell to a second electrical signal.

The assembly also includes a microprocessor which is electrically operatively connected to the first ultrasonic transducer, the second ultrasonic transducer, and the ultrasonic signal generator. The microprocessor can include circuitry for comparing the first electrical signal and the second electrical signal to identify the particular cell above which the ultrasonic signal is generated corresponding to such first and second electrical signals. In this manner, the particular cell can be identified and the results of the specimen analysis in such cell is recognized.

The ultrasonic signal generator is electrically connected to the microprocessor. In such an assembly, the microprocessor recognizes the time the electrical signal is received from the signal generator and compares the time differential between the acknowledgment of the signal and the time the first electrical signal from the first ultrasonic transducer is received and the time differential between the acknowledgment of the signal to the time the second electrical signal from the second ultrasonic transducer is received. The microprocessor can include circuitry for comparing such differential times and, based upon such comparison, it determines and identifies the cell above which the ultrasonic signal was generated. Thus, the specific cell and the results of the specimen analysis in such a cell can be located, identified, and indicated.

BRIEF DESCRIPTION OF THE DRAWINGS

The invention herein will be better understood with regard to the following description, accompanying claims and accompanying drawings wherein:

FIG. 3 is a perspective view partially in section of the assembly herein in.

DETAILED DESCRIPTION

Figure 1:
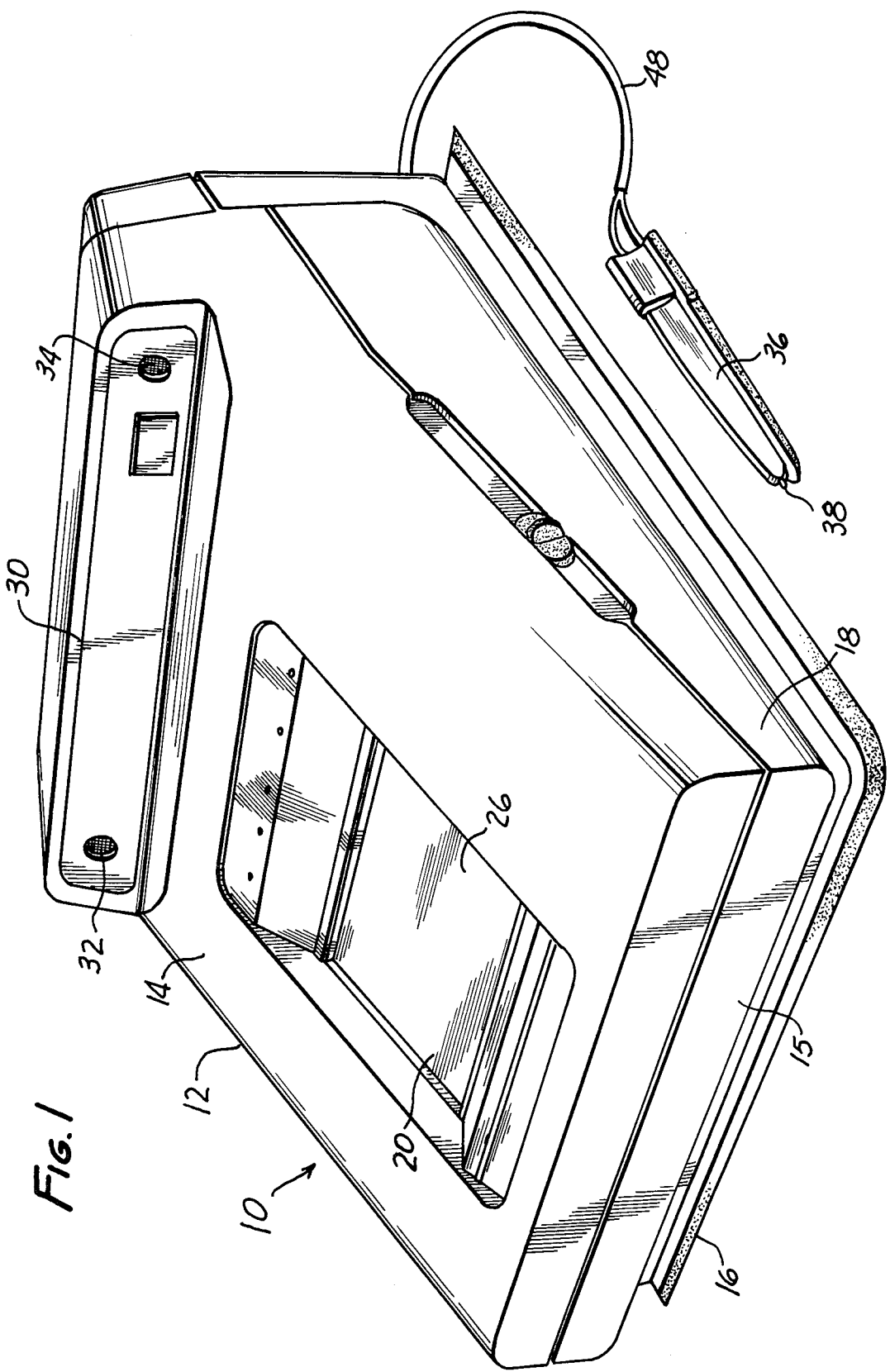
FIG. 1 is a perspective view of the assembly herein.

The invention herein is directed to an assembly for identifying the results of a specimen analysis wherein such specimen analysis occurs in an array of discrete cells. With regard to FIGS. 1, 3, and 4, an assembly 10 for identifying the results of a specimen analysis is illustrated.

The assembly 10 includes a housing 12 having an upper wall 14, a bottom wall 16, sidewalls 18 and end walls 15. In the assembly shown in FIGS. 1-3, the housing is generally rectangular box-shaped. The bottom wall, top wall, and end walls are generally rectangular, and the sidewalls generally are trapezoidal in shape. In the preferred embodiment shown in the drawings, the top wall has a gradual slope as shown. Generally such a slope is about 15° from horizontal (the plane of the bottom wall). Such slope permits ease of viewing of a microdilution plate or tray or array of cells by the user.

Along the top wall and centered on the top wall is a recess 20. The recess has a size and shape sufficient for receiving and holding the panel or array of cells to be reviewed. The recess 20 includes a transparent platform or plate 26. The plate 26 is transparent so that a light source 28 within the housing can emit light through the transparent plate 26 and thereby through the array of cells placed in the recess. The recess 20 can be open into the instrument without the need for providing a transparent platform or plate 26. When the recess 20 is open, the microdilution panel can be placed in the recess and the light source, when activated, will provide light directly through the microdilution tray or panel.

Figure 2:
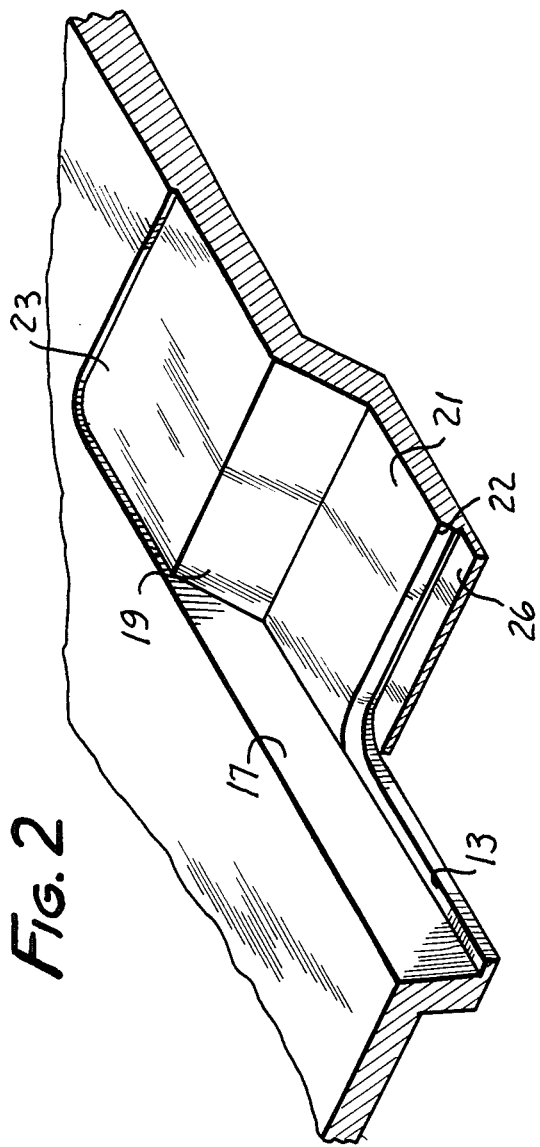
FIG. 2 is an enlarged perspective fractional view partially in cross section of a corner of the recess of FIG. 1.

The recess 20 is shown in the partial sectional view shown in FIG. 2 which is a partial sectional view directly at a corner of the recess. As shown in FIG. 2, the recess is encircled by an upstanding edge 22 which extends into two shelves 21 at opposite ends of the recess. The shelves 21 provide the support for the array of cells. It is preferable to provide such shelves to support the array of cells in order not to scratch the transparent plate 26 when a transparent plate 26 is present in the instrument. That is, the transparent plate 26 is recessed below the plane of the support shelves 21. The sidewalls of the recess are generally vertical as shown in FIG. 2 by the vertical sidewall 17. Such sidewalls prevent movement of the array of cells placed in the recess. The end wall 19 of the recess is sloped to facilitate the insertion and removal of the array of cells in the recess. The juncture between the shelves 21 and the sloping end walls 19 also provides correct alignment of the array of cells when placed in recess.

The end wall 19 further extends into a second shelf 23. Such a second shelf 23 can provide a support shelf for a transparent cover (not shown) which can be used to enclose the array of cells within the recess. The cover, if used, is transparent in order to be able to view the individual cells in the array and whether any light is being absorbed, scattered, or transmitted through the cells. A cover element can provide a surface upon which an ultrasonic signal can be produced as well hereinafter be more fully described. In the preferred assembly, the array of cells can include its own cover. When the array of cells includes its own cover, then such a cover element can provide the surface upon which an ultrasonic signal can be generated, as will be hereinafter be more fully described. It should also be apparent that the array of cells itself (the tray) can provide a surface immediately adjacent each cell upon which an ultrasonic signal can be produced. In the preferred embodiment, the second shelf provides actuation elements for function selection; i.e., process, edit, abort, no report, and calibrate. Such function selection elements provide direct commands to the microprocessor to instruct the microprocessor on what to do with the data it receives.

In the recess 20 along the sidewalls 17, there can be a lip or ledge 13 which can provide added support for the array of cells.

Figure 3:
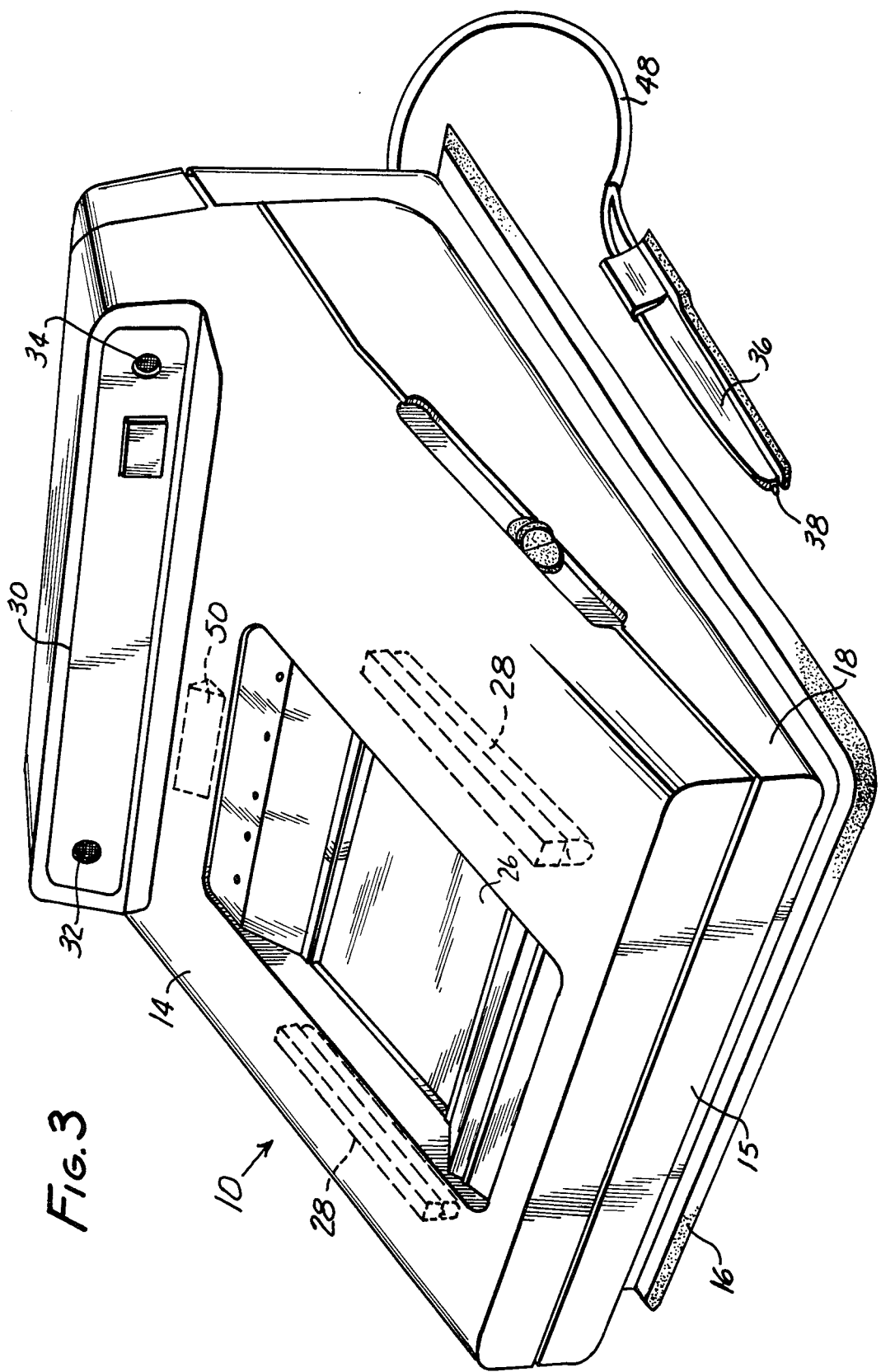

In the housing is a light source 28 as seen in FIG. 3. The light source 28 can be provided in the housing such that it emits light which is directed through the transparent plate 26 and into and through the recess wherein the array of cells are received. The light source can be any suitable light source depending upon the specimen analysis being conducted. The light source can be provided in the housing such that it provides direct light through the transparent plate 26 or such that it provides indirect or reflected light through the transparent plate and recess. In the preferred embodiment shown, two lamps on either side of the recess are used as a light source which provides indirect light through the panel or tray of cells. Preferred lamps are six inch fluorescent lamps of four watts each.

The upper wall also includes an upstanding wall portion 30. The upstanding wall portion 30 provides a support above the surface of the upper wall for a first ultrasonic signal transducer 32 and a second ultrasonic signal transducer 34. In the assembly herein, at least two ultrasonic signal transducers are required for operation of the assembly. The first and second ultrasonic signal transducers are provided on the upstanding wall portion in order to assure that any ultrasonic wave generated above the cells in the array is received by each of the ultrasonic signal transducers. The first and second ultrasonic signal transducers can be any acceptable transducer which is capable of converting an ultrasonic wave or signal to an electrical signal. For example, many microphones are acceptable for use as the ultrasonic signal transducers. A particularly preferred microphone is a microphone which can receive ultrasonic waves within the range of up to about 50 decibels. Such a microphone is commercially available from Science Accessories Corporation, as well as other microphone manufacturers.

The first and second ultrasonic signal transducers are electrically connected to a microprocessor 50 through appropriate electrical connections. The microprocessor 50 can be provided in the housing. The microprocessor contains electrical circuitry capable of converting the electrical signals received from each of the first and second ultrasonic signal transducers to an identifying indicia which can identify a particular cell in the array of cells placed in the recess. The operation of the microprocessor will also be hereinafter more fully described.

The first and second ultrasonic signal transducers are spaced apart on the upstanding wall portion 30 of the top wall 14. The first and second ultrasonic signal transducers are spaced apart in order to provide an ability for triangulation of the ultrasonic signal to determine the location from which the ultrasonic wave of the ultrasonic signal has been generated.

Figure 4:
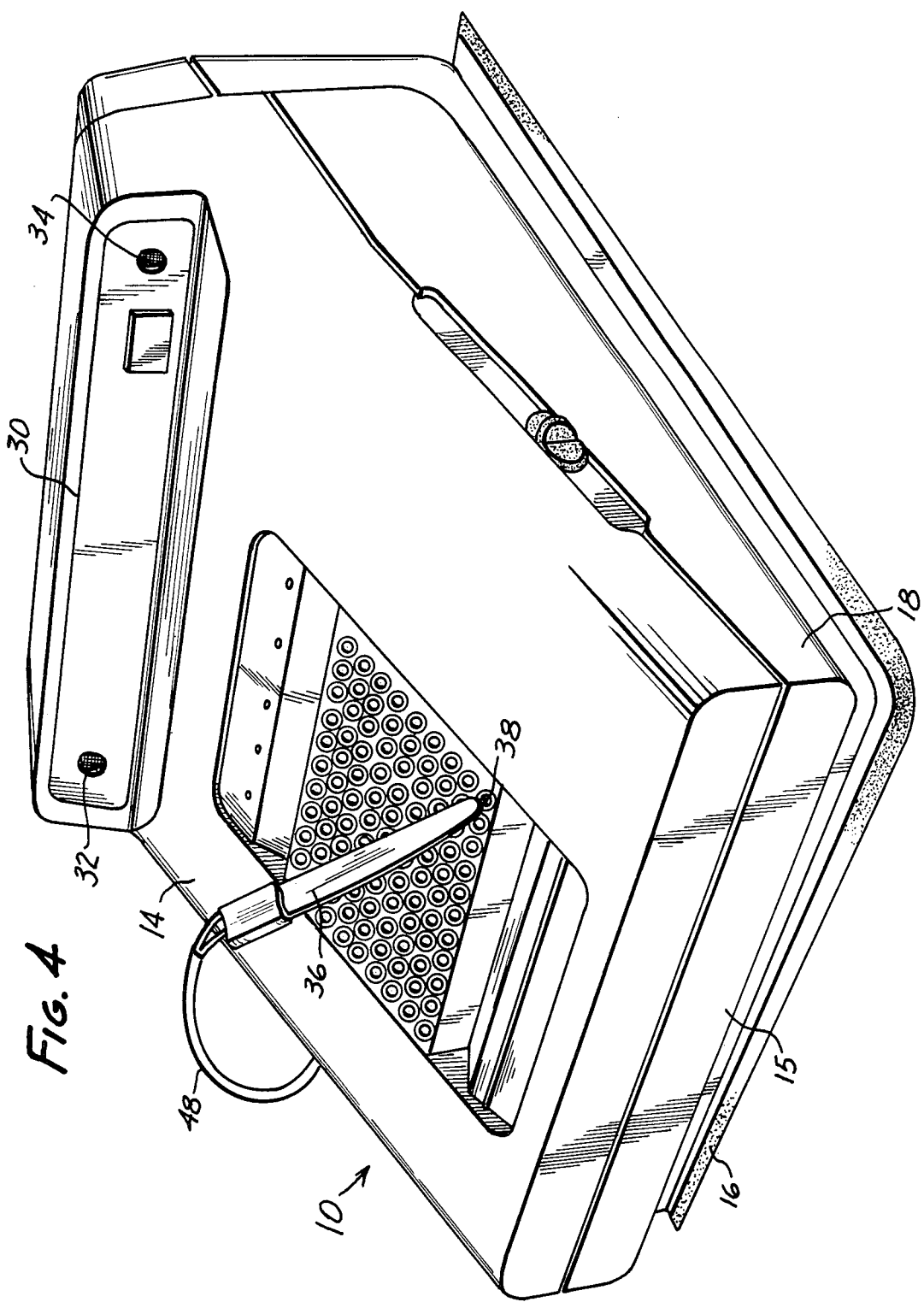
FIG. 4 is a perspective view of the assembly and a microdilution tray illustrating the use of the assembly.

The assembly also includes a device which can provide an ultrasonic signal immediately adjacent and/or above any selected cell in the array of cells when such array is placed in the recess. FIG. 4 illustrates a tray of an array of discreet cells in the recess of the assembly. With regard to FIG. 1, an ultrasonic signal generator 36 is illustrated. The ultrasonic signal generator is a stylus having an ultrasonic signal producing tip 38. For example, at the ultrasonic signal producing tip can be a spring-loaded rod which projects outwardly from the generator upon actuation such as by touching the tip against a surface. The spring-loaded rod can shoot outwardly of the tip, striking the surface, thereby producing an ultrasonic signal. Such devices are well-known and commercially available. The commercially available devices can be used in the assembly herein.

Another embodiment of an ultrasonic signal generator can be an electrical ultrasonic signal generator. The electrical ultrasonic signal generator is the preferred choice as it can provide a distinct and sharp ultrasonic signal which provides ease of identifying and locating. Such an electrical generator includes a tip for positioning above the cell in the array to be identified. The electrical ultrasonic signal generator includes a transducer or an emitter of ultrasonic signals or spark gap generator which can create an ultrasonic signal at the tip. The electrical ultrasonic signal generator is electrically connected to the microprocessor 50 through an electrical lead 48. The electrical lead 48 can carry an electrical signal to the microprocessor at the time an ultrasonic signal is generated at the tip of the signal generator.

It is believed that an understanding of the assembly will be better understood with regard to the following discussion of the operation of the assembly in a specimen analysis. In the operation of the assembly, for example in an analysis to determine minimum inhibitory concentrations, a panel or tray comprising an array of cells is inserted into the recess 20 of the housing. Such a tray can be a tray containing 96 wells arrayed in 12 rows of 8 wells or cells each. For an MIC evaluation, a specimen can be inoculated into each of the wells which contain varying concentrations of the antibiotic to be evaluated. Following incubation of the tray, there will be either growth or no growth in the cells, depending upon the effect of the antibiotic on the organism.

The tray is placed in the recess such that the tray is fixed and does not move. The tray can be placed in the recess such that a corner of the tray coincides with a corner of the recess, thereby assuring a stability to the tray or array of cells. In order to maintain accuracy of readings, even for using trays of different sizes with differing numbers of cells, the tray should always be located with respect to one corner of the recess. In this manner, any particular cell of any given array will always be at the same location with respect to the two ultrasonic signal transducers.

The light source is activated which provides light which is directed through the open recess or the transparent plate 26 if present and then through the array of cells. The attendant views and identifies those cells wherein no growth has occurred. That is, the attendant views the cells in the array to determine which cells should be specifically identified for whatever the reason and depending upon the analysis being conducted. In order to identify a particular cell, the attendant (lab technician) can touch or strike the transparent tray cover with the ultrasonic signal generator immediately above the cell to be identified. The ultrasonic signal generator creates an ultrasonic signal upon touching the tip thereof to the transparent surface immediately above the cell to be identified. If no tray cover is used, the ultrasonic signal generator can be touched to the surface of the tray adjacent the cell or well to be identified. By incorporating proper software and directions to the attendant to always touch the same location (above, below, right side, or left side) on the surface adjacent the well to be identified, the proper well will be recognized.

The ultrasonic wave generated by the ultrasonic signal generator is received by the first and second ultrasonic signal transducers 32 and 34 respectively. Due to the position of the cell within the array, the signal or ultrasonic wave generated immediately above the cell will take a known (known to the microprocessor) amount of time to reach each of the first ultrasonic signal transducer and the second ultrasonic signal transducer. By recognizing and comparing the times the ultrasonic signal takes to reach and be received by the two ultrasonic signal transducers, the precise position of the origin of the ultrasonic signal, and therefore the cell, can be identified by the microprocessor. The first ultrasonic signal transducer receives the ultrasonic wave or ultrasonic signal and transforms the signal to an electrical signal which it transmits to the microprocessor 50. Concomitantly, the same ultrasonic signal has been received by the second ultrasonic signal transducer and is converted to an electrical signal and also communicated to the microprocessor.

The electrical ultrasonic signal generator is electrically connected to the microprocessor. In the assembly, at the time an ultrasonic signal is generated, an initializing electrical signal is also generated which is transferred to the microprocessor through the electrical wire 48. The microprocessor identifies that signal to the electrical signals received from the first and second ultrasonic signal transducers corresponding to the ultrasonic signal generated and picked up by such transducers. Based upon these three electrical signals received by the microprocessor, it can identify (through circuitry for determining triangulation) the source of the ultrasonic signal and thereby identify the particular cell. The microprocessor can distinguish the time differential between the receiving of the initializing electrical signal and the two first and second electrical signals. Based upon these time differentials, the location of the well can be determined. All of these events can occur in microseconds due to the use of electronics. Thus, the assembly herein can be easily and quickly used for such analyses.

The microprocessor can be connected to a memory in which predetermined values have been placed for each of the cells in the array. In such an event, the microprocessor can take the signals received during an analysis and compare such signals representing the times during the analysis with the time signals (or representative values) stored in the memory and, after such comparison, identify the cell from which the ultrasonic signal originated. The use of a microprocessor can provide the system with an ability to store coordinates for each cell or well in the array of cells. Then during an analysis, the coordinates determined during the analysis of the ultrasonic signals can be matched to the stored coordinates. The well whose coordinates match the determined analysis value is deemed the one chosen by the operator. Alternatively, an algorithm (as opposed to a table of coordinate values) can be derived which, through appropriate arithmetic operations, can yield a number identifying the wells selected by the operator given the coordinate values. That is, the microprocessor can perform the algorithm by inputting the coordinate values determined during the analysis. The results of the algorithm then can be used to identify the particular well selected by the operator. The instrument herein performs its identification function based on spatial coordinates rather than on time coordinates and for this reason is able to identify and locate a well in a given array.

We claim:

1. An assembly for identifying the results of a specimen analysis wherein such specimen analysis occurs in an array of discrete cells, the assembly comprising:
    a housing having top, bottom, end walls, and sidewalls;
    an array receiving means on the top wall for receiving and holding an array of discrete cells in a fixed position;
    an ultrasonic signal producing means for selectively producing an ultrasonic signal adjacent a cell in the array in which the results of the analysis are to be identified and for providing an initializing electrical signal;
    a first transducer means on the top wall for converting an ultrasonic signal from the ultrasonic signal producing means to a first electrical signal;
    a second transducer means on the top wall for converting an ultrasonic signal from the ultrasonic signal producing means to a second electrical signal; and
    conversion means electrically operatively connected to the ultrasonic signal producing means, the first transducer means, and to the second transducer means for comparing the initializing electrical signal to the first electrical signal and second electrical signal to identify the cell above which the ultrasonic signal was produced.

2. An assembly as recited in claim 1 wherein the first and second transducer means comprise microphones.

3. An assembly as recited in claim 2 wherein the first and second transducer means are spaced an equal distance from the center of the array receiving means.

4. An assembly as recited in claim 3 wherein the top wall includes an upstanding portion along which the first and second transducer means are located.

5. An assembly as recited in claim 4 wherein the top wall slopes at an angle away from the upstanding portion.

6. An assembly as recited in claim 1 wherein the array receiving means comprises a recess on the top wall.

7. An assembly as recited in claim 1 wherein the conversion means comprises logic means for distinguishing between the first and second electrical signals, memory means for storing a series of values representative of first and second electrical signals from each of the cells in an array and identifying such values to a cell, which series can be stored in such memory means prior to performing an analysis, and comparison means for comparing the received first and second electrical signals from the first and second transducer means with the series of stored values in the memory means.

8. An assembly as recited in claim 1 wherein the conversion means further comprises comparative means for comparing the time of receiving the electrical signal from the ultrasonic signal producing means with the time thereafter it takes to receive the first electrical signal and the time thereafter for receiving the second electrical signal.

* * * * *

UNITED STATES PATENT AND TRADEMARK OFFICE
CERTIFICATE OF CORRECTION

PATENT NO. : 4,641,528
DATED : February 10, 1987
INVENTOR(S) : John W. Clayland, Jr.
Carl P. Daniel It is certified that error appears in the above-identified patent and that said Letters Patent are hereby corrected as shown below:

On cover page: delete as asignee: "American Hospital Supply Corp., Deerfield, Ill." and insert as asignee: --Baxter Travenol Laboratories, Inc., Deerfield, Ill.---

Signed and Sealed this

Twelfth Day of July, 1988

Attest:

DONALD J. QUIGG

Attesting Officer

Commissioner of Patents and Trademarks